(12) United States Patent
Li et al.

(10) Patent No.: US 12,277,713 B2
(45) Date of Patent: Apr. 15, 2025

(54) METHOD AND SYSTEM FOR DETECTING AND REPAIRING SUN GLINT IN UAV OPTICAL RGB OCEAN IMAGES

(71) Applicant: Wuhan University, Wuhan (CN)

(72) Inventors: Ming Li, Wuhan (CN); Jiangying Qin, Wuhan (CN); Deren Li, Wuhan (CN); Jiageng Zhong, Wuhan (CN)

(73) Assignee: Wuhan University, Wuhan (CN)

( * ) Notice: Subject to any disclaimer, the term of this patent is extended or adjusted under 35 U.S.C. 154(b) by 0 days.

(21) Appl. No.: 18/780,297

(22) Filed: Jul. 22, 2024

(65) Prior Publication Data
US 2024/0394892 A1    Nov. 28, 2024

(30) Foreign Application Priority Data

May 22, 2023    (CN) .......................... 202310578108.8

(51) Int. Cl.
*G06T 7/12*    (2017.01)
*G06T 7/20*    (2017.01)
*G06V 10/44*   (2022.01)
*G06V 10/60*   (2022.01)
*G06V 20/17*   (2022.01)

(52) U.S. Cl.
CPC .................. *G06T 7/12* (2017.01); *G06T 7/20* (2013.01); *G06V 10/44* (2022.01); *G06V 10/60* (2022.01); *G06V 20/17* (2022.01)

(58) Field of Classification Search
CPC ......... G06T 7/12; G06T 7/20; G01S 13/4427; G06V 20/17; G06V 10/60; G06V 10/44
See application file for complete search history.

(56) References Cited

U.S. PATENT DOCUMENTS 9,418,411 B2 *   8/2016   Patterson ............... G06V 20/13
9,903,719 B2 *   2/2018   Hunter, Jr. ........... G01C 21/005
(Continued)

FOREIGN PATENT DOCUMENTS

CN    114187331 A          3/2022
CN    110532989 B  * 10/2022      ........... G06K 9/0063
(Continued)

OTHER PUBLICATIONS

Hedley, J. D., A. R. Harborne, and P. J. Mumby. "Simple and robust removal of sun glint for mapping shallow-water benthos." International Journal of Remote Sensing 26.10 (2005): 2107-2112.*
(Continued)

*Primary Examiner* — Shefali D Goradia
(74) *Attorney, Agent, or Firm* — Nitin Kaushik

(57) ABSTRACT

The invention discloses a method and system for detecting and repairing sun glint in UAV optical RGB ocean image, introduces a sun glint attention module, and constructs a semantic segmentation network model based on attention mechanism. The sun glint region is segmtioned by semantic segmentation network model based on attention mechanism, and the optical flow field of high-resolution UAV optical RGB ocean image is extracted by RAFT optical flow estimation network. sun glint region and optical flow field are used for optical flow propagation to repair the sun glint in UAV optical RGB ocean images and restore the real benthic image features.

5 Claims, 12 Drawing Sheets

(56) References Cited

U.S. PATENT DOCUMENTS

2007/0242884 A1* 10/2007 Dugan .................. G06V 20/13
382/190
2021/0327031 A1* 10/2021 Xie ......................... G06T 5/70
2024/0013531 A1* 1/2024 Hu ....................... G06V 10/764

FOREIGN PATENT DOCUMENTS

| CN | 115359372 A | 11/2022 |
| CN | 115908442 A | 4/2023 |

OTHER PUBLICATIONS

Wang, Shengke, et al. "Specular reflection removal of ocean surface remote sensing images from UAVs." Multimedia Tools and Applications 77 (2018): 11363-11379.*

* cited by examiner

METHOD AND SYSTEM FOR DETECTING AND REPAIRING SUN GLINT IN UAV OPTICAL RGB OCEAN IMAGES

CROSS-REFERENCE TO RELATED APPLICATIONS

The application claims priority to Chinese patent application No. 202310578108.8, filed on May 22, 2023, the entire contents of which are incorporated herein by reference.

TECHNICAL FIELD

The present invention relates to the technical field of remote sensing image preconditioning in ocean surface remote sensing monitoring, and particularly to a method and system for detecting and repairing sun glint in UAV optical RGB ocean images.

BACKGROUND

At present, sun glint is a fundamental issue in ocean remote sensing data processing. It is caused by the specular reflection of seawater, which leads to the direct reflection of sunlight on the sensor and causes partial pixel susaturation, which is inevitable in ocean observations of different scales, as shown in the box in FIG. 1. Sun glint can contaminate images, block seabed features and seabed information of interest in marine ecological monitoring and other studies, thus affecting the accuracy of marine benthic community distribution mapping and topographic mapping.

Research technicians propose solutions to the sun glint problem, such as choosing to acquire images on cloudy days, or designing specific observation angles and observation fields for data acquisition. But this is not always possible: images obtained on cloudy days have lower visibility resulting in lower image quality and loss of detail; However, the data acquisition of specific observation angle and field of view is difficult to meet the spatio-temporal requirements of multi-angle and high-revisit-frequency acquisition tasks. On the other hand, some researchers consider increasing the overlap of images and discarding areas with serious sun glint phenomenon to solve the problem of image blocking and pollution by sun glint, but too much data redundancy will increase the acquisition cost, and can not completely solve the impact of sun glint. To sum up, most of the existing solutions are to solve the sun glint problem by putting additional requirements on the data acquisition stage, only a few methods attempt to detect and repair the collected ocean remote sensing optical images, and there is still a large space for exploration, and there is no sun glint repair method using only optical RGB images.

The existing research on sun glint remediation methods for remote sensing images mainly focuses on medium and high-resolution satellite images, especially hyperspectral and multispectral images. However, satellite-based ocean observation is limited by spatial resolution, temporal resolution and radiation resolution, and it is difficult to reach the high precision observation requirements of centimeter level. On the other hand, researchers in the field of ocean monitoring are increasingly using UAVs equipped with high-resolution RGB cameras for marine data acquisition. As a mature, efficient and easy-to-deploy remote sensing platform, UAV can provide rich information with low cost and high signal-to-noise ratio, and make up for the data gaps of in-situ investigation and satellite remote sensing in marine ecological monitoring and other applications. Therefore, it has become an indispensable remote sensing platform in marine ecological monitoring and environmental protection. However, the detection and repair methods of sun glint in high-resolution unmanned aerial vehicle (UAV) RGB ocean images have not been studied and proposed at the same time, resulting in the low efficiency or even unavailability of many high-resolution UAV optical RGB ocean images affected by sun glint.

Therefore, the processing of sun glint in high-resolution UAV optical RGB ocean images has great scientific value and practical significance. Detection and repair of sun glint in high-resolution UAV optical RGB ocean images, on the basis of accurately detecting the sun glint in the image, not only should the pixel features of the obscured area be visually reasonable and structurally consistent with those of other areas of the image, but also ensure that the recovered pixel features can reflect the real information of the submarine habitat as much as possible. Therefore, it is difficult to detect and repair sun glint in high-resolution UAV optical RGB ocean images.

Through the above analysis, the existing problems and defects of the prior art are as follows:

(1) It is difficult to avoid the problem of sun glint in the data acquisition stage. Prior art attempts to avoid the sun glint problem in the data acquisition stage by observing on cloudy days, designing specific viewing angles and fields of view, increasing image overlap, and discarding areas or images with severe sun glint phenomena. However, these methods are simple and crude, or lead to excessive data redundancy and greatly increase the image acquisition cost of marine ecological monitoring and other observation tasks, and it is difficult to meet the actual observation needs of multi-angle and high-revisit-frequency acquisition tasks.

(2) Lack of accurate sun glint detection methods for UAV optical RGB ocean images. Most of the existing detection methods of sun glint introduce the data of other sensors such as spectrometers to solve the problem of sun glint detection, and the detection accuracy of sun glint in UAV optical RGB ocean images needs to be improved.

(3) Lack of accurate sun glint repair methods. At present, no published papers or patents have proposed an efficient and accurate complete solution to the sun glint image occlusion problem in UAV optical RGB ocean images, which makes it difficult to ensure the accuracy of marine ecological monitoring and terrain mapping based on UAV optical RGB ocean images, and even difficult to realize the observation task due to the lack of key information.

(4) Not suitable for complex scenes: in a complex marine environment, the sea wave is not a plane of the sea level, but countless approximate small planes, the existing methods are difficult to detect and repair the sun glint efficiently, and often produce a large number of false detection and missed detection phenomena.

SUMMARY

Aiming at existing technology problems, the invention provides a method and system for detecting and repairing sun glint in UAV optical RGB ocean images. In particular, it relates to a method and system for detecting and repairing sun glint in high-resolution UAV optical RGB ocean images based on attention mechanism and optical flow.

The invention provides a method for detecting and repairing sun glint in UAV optical RGB ocean images. The method for detecting and repairing sun glint in UAV optical RGB ocean images includes: introducing the sun glint attention module, constructing a semantic segmentation network model based on the attention mechanism; The hybrid loss function of Focal and Dice was used to guide the semantic segmentation network training, and the trained semantic segmentation network SGNet was used to detect the sun glint region. The optical flow field of high-resolution UAV optical RGB ocean images is extracted by RAFT optical flow estimation network, and the sun glint region is transmitted by optical flow propagation to repair the sun glint in UAV optical RGB ocean images and recover the real benthic image features.

Further, the method and system for detecting and repairing sun glint in UAV optical RGB ocean images consists of the following steps:

Step 1, the sun glint attention module SGA is introduced into the UNet network structure to extract and enhance the interesting sun glint features and construct the semantic segmentation network;

Step 2, the Focal and Dice hybrid loss function is used to guide the semantic segmentation network training, and use the trained semantic segmentation network SGNet to detect the sun glint region;

Step 3, the optical flow fields of adjacent high-resolution UAV optical RGB ocean images are extracted by RAFT optical flow estimation network;

Step 4, the sun glint region detected by SGNet and the optical flow field extracted by RAFT were used for optical flow propagation between image frames to repair the pixels blocked by sun glint;

Step 5, For pixels that cannot be repaired by optical flow propagation, the CSA image generation network is used to repair a single image, and the repair result is added to the optical flow propagation of the next iteration as a known value to obtain the final sun glint repair result;

Further, in step 1, the sun glint attention module SGA is introduced into the UNet network structure, which includes: the features of the last layer of the first three decoders of UNet are up-sampled to the size of 224×224×2 by SGA module and supervised by ground truth; Among them, the sun glint attention module SGA includes:

The input features are fed into the 3×3 convolution layer to obtain feature F1; Feature F1 is then passed through the first 1×1 convolutional layer to extract feature F2. The feature F3 of interest is extracted from the feature F2 through the SE attention module. The sun glint feature F4 is enhanced by the multiplication and fusion of F2 features and F3 features. F4 is passed through the second 1×1 convolutional layer to extract features, which are then added to features F1 to obtain the final sun glint features F.

Further, in step 2, the Focal and Dice hybrid loss functions is used to guide semantic segmentation network training, which includes: the output features of the first three SGNet decoders via SGA are supervised by Dice loss function, and the final output of the network is supervised by Focal and Dice loss function.

Further, in step 4, optical flow propagation between image frames includes: forward and backward optical flow propagation of pixels blocked by sun glint until two known pixels are obtained; The consistency errors of two known pixels are calculated respectively, and the weights are assigned according to the errors. Finally, the final repaired pixels are obtained by weighted fusion of two known pixels.

Wherein, the formula for calculating the consistency error is as follows:

$$err_{mn}(i) = \sqrt{(f_{mn}(i))^2 + (f_{nm}(j))^2};$$

Where, i and j represent the corresponding pixels on image frame m and image frame n, $err_{mn}$ represent the consistency errors, and $f_{mn}$ represent the optical flow value from image frame m to image frame n.

The weighted fusion weight formula is as follows:

$$w = \frac{err_{mean}}{err};$$

Where, w represents the weight, err represents the consistency error, and $err_{mean}$ represents the mean value of the consistency error.

Another purpose of the invention is to provide a system for detecting and repairing sun glint in UAV optical RGB ocean images which applies the method for detecting and repairing sun glint in UAV optical RGB ocean images, including:

Semantic segmentation network building module, which is used to introduce the sun glint attention module SGA into the UNet network structure to extract and enhance the interesting sun glint features and construct the semantic segmentation network.

Sun glint region acquisition module, which is used to guide semantic segmentation network training by using Focal and Dice hybrid loss function, and detect the sun glint region by using the trained semantic segmentation network.

Optical flow field extraction module, which is used to extract optical flow fields of adjacent high-resolution UAV optical RGB ocean images using RAFT optical flow estimation network.

Sun glint repair module, which is used to use the sun glint region and optical flow field to carry out optical flow propagation between image frames to repair pixels blocked by sun glint; For pixels that cannot be repaired by optical flow propagation, the CSA image generation network is used to repair a single image, and the repair result is added to the optical flow propagation of the next cycle iteration as a known value to obtain the final sun glint repair result.

Another object of the invention is to provide a computer device comprising a memory and a processor, the memory stores a computer program, and when the computer program is executed by the processor, the processor performs the steps of the method for detecting and repairing sun glint in UAV optical RGB ocean images.

Combined with the above technical scheme and solved technical problems, the technical scheme to be protected by the invention has the advantages and positive effects as follows:

First, the invention uses the high-precision semantic segmentation network SGNet which combines UNet network, sun glint attention module SGA, Focal and Dice hybrid loss function to detect the accurate sun glint region. Secondly, the optical flow field of adjacent high-resolution UAV optical RGB ocean images is extracted by RAFT, and the final sun glint restoration results are obtained by using the circular iteration of optical flow propagation and CSA single image restoration. The invention proposed a semantic segmentation network SGNet based on attention mechanism to segment the high-precision sun glint region, and then utilized the proposed sun glint repair method based on optical flow to effectively repair the sun glint in the high-resolution UAV optical RGB ocean image and restore the real benthic image features. The detection and repair method of sun glint in the high-resolution UAV optical RGB ocean image based on attention mechanism and optical flow can be used to restore the real benthic image features, and the problems of image feature occlusion and information pollution caused by sun glint in remote sensing monitoring of ocean surface can be significantly improved. It provides a high-quality image basis for marine ecological monitoring and benthic mapping based on high-resolution UAV optical RGB ocean images.

The invention provides a novel detection and repair method for sun glint in high-resolution UAV optical RGB ocean images based on attention mechanism and optical flow, which can effectively detect and repair sun glint in high-resolution UAV optical RGB ocean images. The sun glint attention module SGA is introduced into the UNet network structure to construct high-precision semantic segmentation network SGNet, enhance the foreground sun glint features, and use Focal and Dice hybrid loss functions to supervise network training to solve the problem of interclass imbalance between sun glint and background. In addition, the invention uses a repair method of sun glint in high-resolution UAV optical RGB ocean image based on optical flow, utilizes RAFT to extract optical flow field between adjacent image frames, and utilizes the iterative cycle of optical flow propagation and single image repair to repair the sun glint in the image and restore the true sea-bed image features. The problem of image pollution and feature occlusion caused by sun glint in high-resolution UAV optical RGB marine images is effectively solved.

Second, the detection and repair method of sun glint in the UAV optical RGB ocean image can significantly improve the problem of feature occlusion and information pollution caused by sun glint in remote sensing monitoring of ocean surface, restore the true benthic seabed characteristics while repairing the sun glint, and greatly improve the image quality and use efficiency of high-resolution UAV optical RGB ocean image. It provides a high-quality image basis for marine ecological monitoring and seabed topography mapping based on high-resolution UAV optical RGB ocean images.

Third, as creative auxiliary evidence of the claims of the invention, it is also reflected in the following important aspects:

(1) The Technical Scheme of the Invention Fills the Technical Gap in the Industry Around the World:

Sun glint can contaminate images and obscure seafloor features of interest, affecting high-precision marine ecological monitoring and benthic community mapping. At present, images are mainly collected on cloudy days or specific observation angles and fields of view are designed to reduce the blocking of image features by sun glint. However, the low visibility of images obtained on cloudy days leads to poor image quality and loss of image details, and the data acquisition methods with specific observation angles are difficult to meet the requirements of multi-angle and high-revisit-frequency acquisition tasks. The existing methods by increasing the overlap of images and discarding the areas or images with severe sun glint will cause a lot of data redundancy and increase the acquisition cost. In addition, these methods, by placing additional requirements on the data acquisition phase, cannot process archived images that have already been captured. Current research on sun glint detection and repair methods in archived images is mainly focused on hyperspectral and multispectral images to accurately identify sun glint through the introduction of additional spectral information. As a mature, efficient and easily deployed remote sensing platform, UAV can provide rich information with low cost and high signal-to-noise ratio, and has become an indispensable sensor in marine ecological monitoring and environmental protection. However, for UAVs, which tend to carry only high-resolution optical RGB cameras, there are no published papers or patents proposing methods for detecting and repairing sun glint in UAVs optical RGB ocean images, resulting in many UAVs optical RGB ocean images affected by sun glint being used inefficiently or even unusable due to loss of detail.

(2) Whether the Technical Solution of the Invention Solves the Technical Problems that People have been Eager to Solve but have not been Successful:

In the remote sensing monitoring of ocean surface, the phenomenon of sun glint is unavoidable. sun glint causes image pollution and feature occlusion, making useful benthic features invisible, thus affecting high-precision marine ecological monitoring and benthic community mapping based on UAV-based optical RGB ocean images. For the problem of sun glint detection and repair in UAV optical RGB ocean images, no complete and effective solution has been proposed, resulting in many UAV optical RGB ocean images affected by sun glint are difficult to use due to detail loss.

(3) Whether the Technical Scheme of the Invention Overcomes the Technical Bias:

The current solutions to the sun glint problem mainly focus on the data acquisition stage by imposing additional constraints on the data acquisition stage. For example, choose to collect data on cloudy days, design specific observation angles and fields of view, set a high degree of influence overlap, and discard areas or images with severe sun glint. These methods will lead to the loss of image details, which is difficult to meet the needs of diverse marine ecological monitoring tasks, and excessive data redundancy will increase the cost of marine ecological monitoring data acquisition. In addition, these methods cannot process the optical RGB ocean images that have been captured by drones, making the massive amount of images that have been captured difficult to use. The technical scheme of the invention overcomes the technical bias of reducing the influence of sun glint in the data acquisition stage, and uses the post-processing mode to detect and repair the high-precision sun glint of the UAV optical RGB ocean image, so that it is not limited by the time and method of data acquisition.

BRIEF DESCRIPTION OF DRAWINGS

In order to more clearly state the technical scheme of the embodiment of the invention, the following is a brief introduction of the drawings required to be used in the embodiment of the invention. It is obvious that the drawings described below are only some embodiments of the invention, and other drawings can be obtained according to these drawings without creative labor for ordinary technicians in the field.

DETAILED DESCRIPTION OF THE EMBODIMENTS

In order to make the purpose, technical scheme and advantages of the invention more clearly understood, the invention is further explained in the following embodiment. It should be understood that the specific embodiments described herein are intended only to explain the invention and are not intended to qualify it.

Aiming at existing technology problems, the invention provides a method and system for detecting and repairing sun glint in UAV optical RGB ocean images. The invention is described in detail in combination with the attached drawings.

Figure 1:
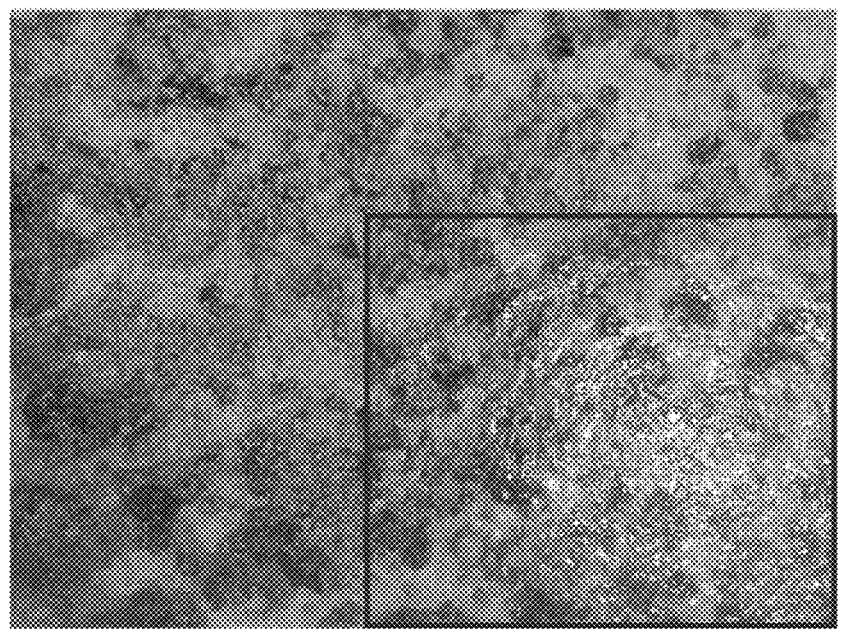
FIG. 1 is an example of the sun glint in UAV optical RGB ocean images provided by prior art.
Figure 2:
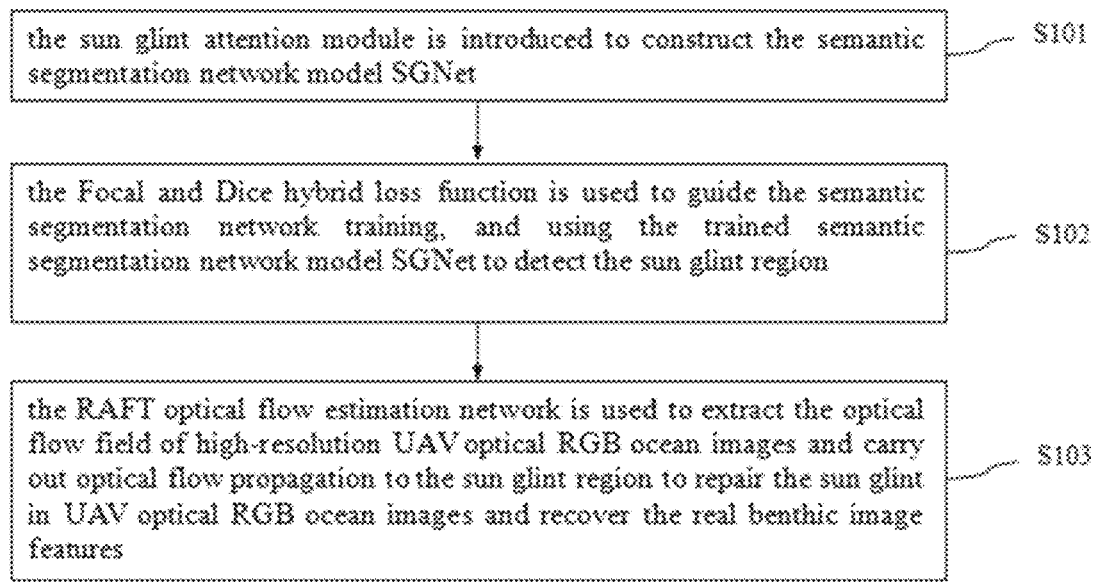
FIG. 2 is a flow chart of the method for detecting and repairing sun glint in UAV optical RGB ocean images provided by the embodiment of the invention.

As shown in FIG. 2, the method for detecting and repairing sun glint in UAV optical RGB ocean images provided by the embodiment of the invention comprises the following steps:

S101, the sun glint attention module is introduced to construct the semantic segmentation network model SGNet.

S102, the Focal and Dice hybrid loss function is used to guide the semantic segmentation network training, and using the trained semantic segmentation network model SGNet to detect the sun glint region.

S103, the RAFT optical flow estimation network is used to extract the optical flow field of high-resolution UAV optical RGB ocean images and carry out optical flow propagation to the sun glint region to repair the sun glint in UAV optical RGB ocean images and recover the real benthic image features.

Figure 3:
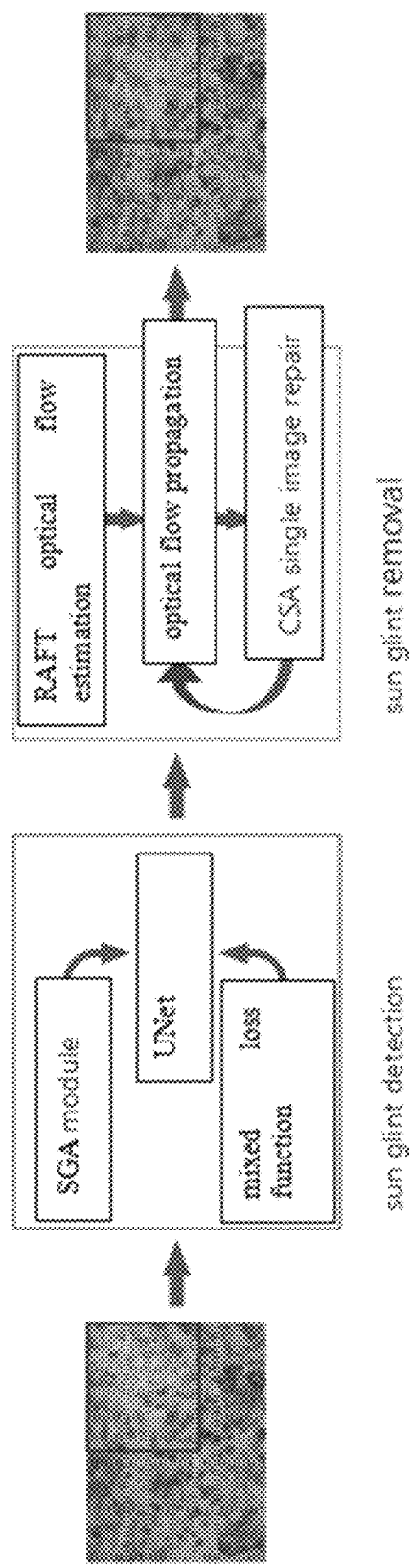
FIG. 3 is the schematic diagram of the method for detecting and repairing sun glint in UAV optical RGB ocean images provided by the embodiment of the invention.

As a preferred embodiment, as shown in FIG. 3, the method for detecting and repairing sun glint in UAV optical RGB ocean images provided by the embodiment of the invention specifically includes the following steps:

Step 1, The sun glint attention module SGA is introduced into UNet network structure to extract and enhance the interesting sun glint features and build a high-precision semantic segmentation network SGNet.

Figure 4:
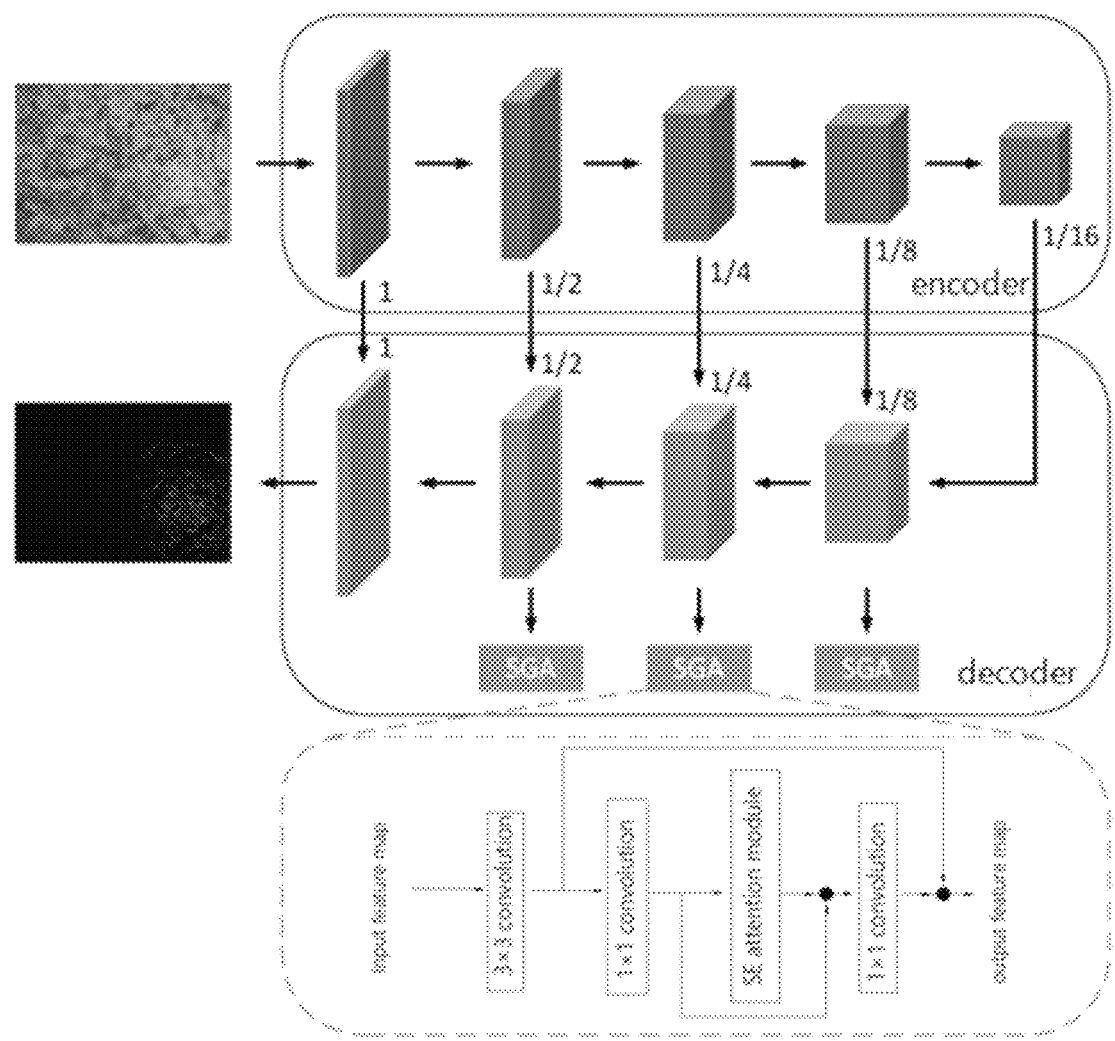
FIG. 4 is the network structure diagram of SGNet, a high-precision semantic segmentation network based on attention mechanism, provided by the embodiment of the invention.

The embodiment of the invention provides the introduction of the sun glint attention module SGA into the UNet network structure, including: the features of the last layer of the first three decoders of UNet are up-sampled to the size of 224×224×2 by the SGA module of the invention and supervised by the ground truth, as shown in FIG. 4. The SGA module provided by the embodiment of the invention comprises: passing the input feature through the 3×3 convolution layer to extract feature F1. The F2 feature is extracted from F1 feature using the first 1×1 convolution layer . . . . The F3 feature is obtained by applying the SE attention module to the F2 feature. The sun glint feature F4 is enhanced by the multiplication and fusion of F2 feature and F3 feature. The further enhanced sun glint feature F is obtained by adding the features extracted from F4 through the second 1×1 convolution layer to feature F1.

Step 2, the Focal and Dice hybrid loss function is used to guide the semantic segmentation network training, and use the trained semantic segmentation network model SGNet to detect the sun glint region.

The embodiment of the invention provides the use of Focal and Dice hybrid loss functions to guide semantic segmentation network training, including: the features of the first three SGNet decoders output via SGA are supervised by Dice loss functions, and the final network output is supervised jointly by Focal and Dice loss functions.

Figure 5:
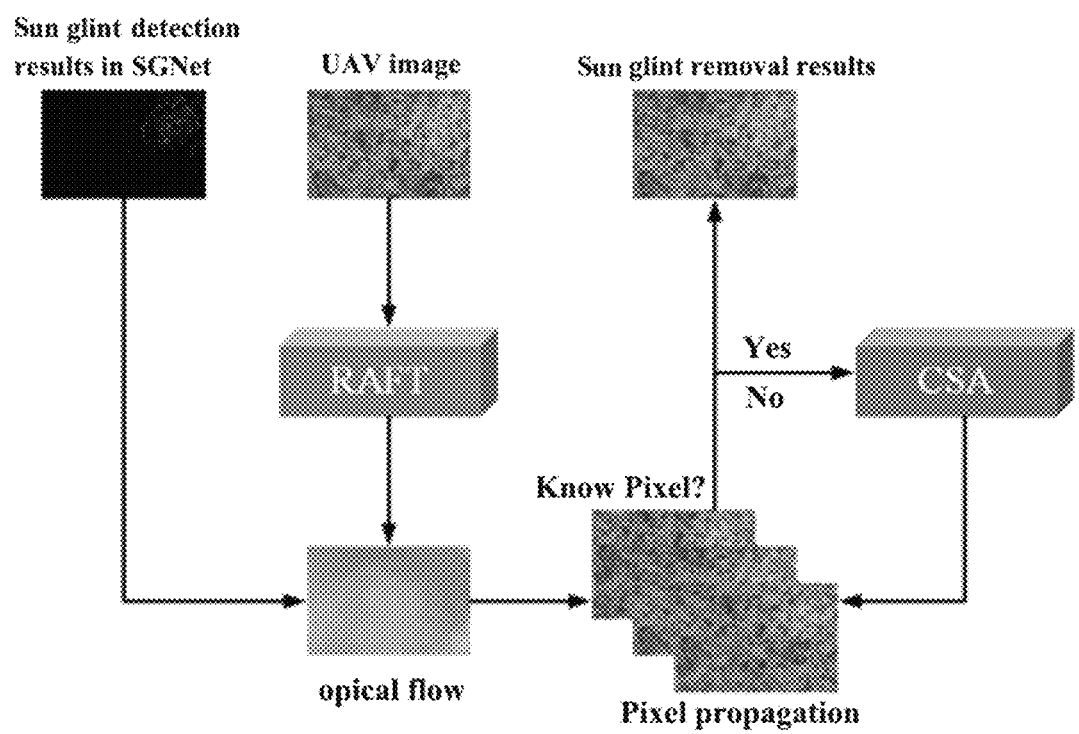
FIG. 5 is the flow chart of sun glint repair based on optical flow provided by the embodiment of the invention.

Step 2, the RAFT optical flow estimation network is used to extract the optical flow field of adjacent high-resolution UAV optical RGB ocean images, and the sun glint region detected by SGNet and the optical flow field extracted by RAFT are used for optical flow propagation between image frames to repair pixels blocked by sun glint. For pixels that cannot be repaired by optical flow propagation, the CSA image generation network is used to repair a single image, and the repair result is added to the optical flow propagation of the next iteration as a known value to obtain the final sun glint repair result, as shown in FIG. 5.

The optical flow propagation between image frames provided by the embodiment of the invention comprises: forward and backward optical flow propagation respectively for pixels blocked by sun glint until two known pixels are obtained. The consistency errors of two known pixels are calculated respectively, and the weights are assigned according to the errors. Finally, the final repaired pixels are obtained by weighted fusion of two known pixels. The formula for the consistency error proposed by the embodiment of the invention is as follows:

$$err_{mn}(i) = \sqrt{(f_{mn}(i))^2 + (f_{nm}(j))^2};$$

Wherein, i and j represent the corresponding pixels on image frame m and image frame n, $err_{mn}$ represents the consistency error, and $f_{mn}$ represents the optical flow value from image frame m to image frame n.

The weighted fusion weight formula provided by the embodiment of the invention is as follows:

$$w = \frac{err_{mean}}{err}$$

Wherein, w represents the weight, err represents the consistency error, and $err_{mean}$ represents the mean value of the consistency error.

Figure 6:
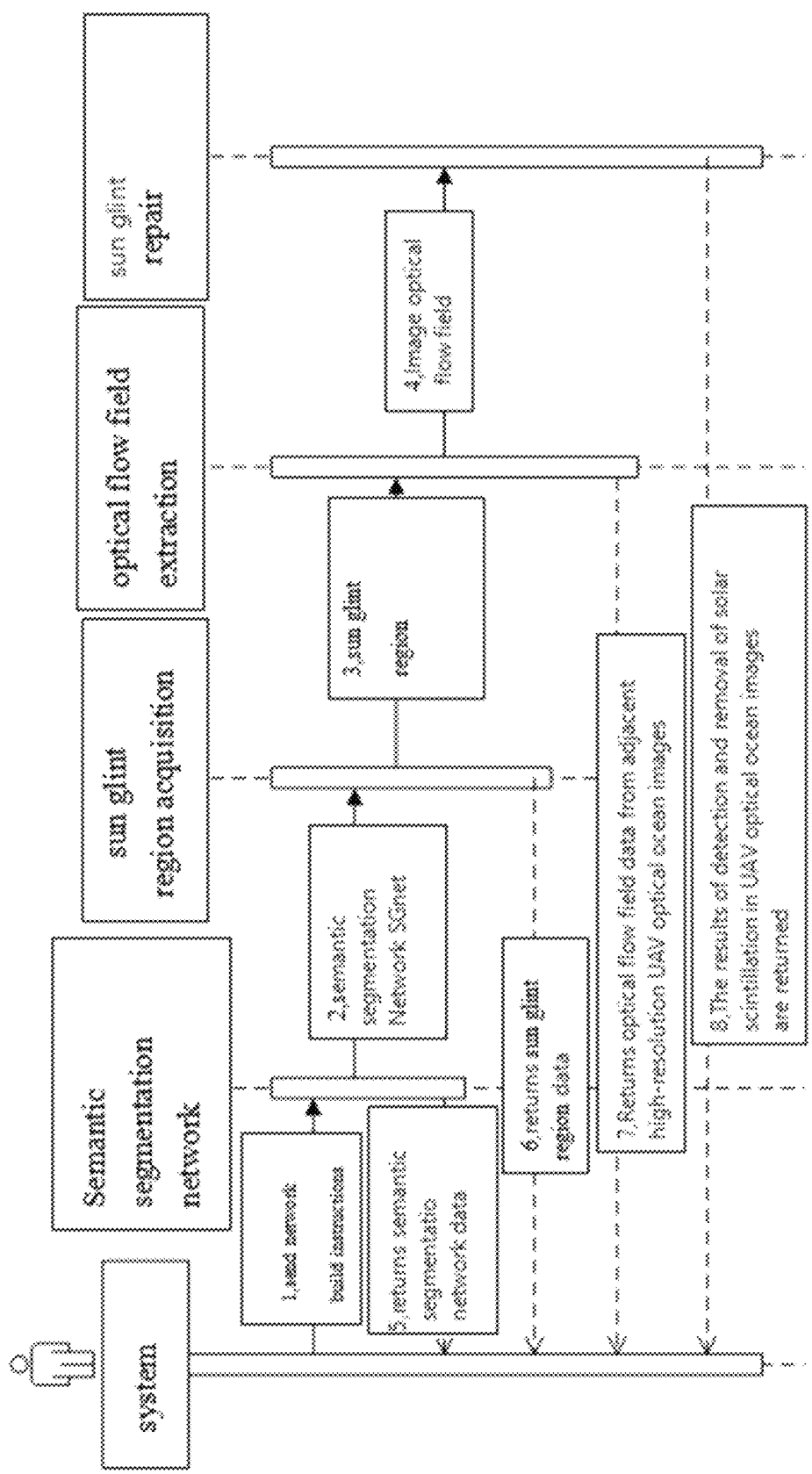
FIG. 6 is the interaction diagram of the system for detecting and repairing sun glint in UAV optical RGB ocean images provided by the embodiment of the invention.

As shown in FIG. 6, the system for detecting and repairing sun glint in UAV optical RGB ocean images provided by the embodiment of the invention comprises:

Semantic segmentation network building blocks, which is used to introduce the sun glint attention module SGA into the UNet network structure to extract and enhance the interesting sun glint features and construct the semantic segmentation network.

sun glint region acquisition module, which is used to guide semantic segmentation network training by using Focal and Dice hybrid loss function, and detect the sun glint region by using the trained semantic segmentation network.

Optical flow field extraction module, which is used to extract optical flow fields of adjacent high-resolution UAV optical RGB ocean images using RAFT optical flow estimation network.

Sun glint repair module, which is used to use the sun glint region and optical flow field to carry out optical flow propagation between image frames to repair pixels blocked by sun glint; For pixels that cannot be repaired by optical flow propagation, the CSA image generation network is used to repair a single image, and the repair result is added to the optical flow propagation of the next cycle iteration as a known value to obtain the final sun glint repair result.

The purpose of the invention is to significantly improve the problem of feature occlusion and information pollution caused by sun glint in remote sensing monitoring of ocean surface, and to provide high-quality image basis for marine ecological monitoring and submarine topography mapping based on high-resolution UAV optical RGB ocean images.

The technical schemes for realizing the purpose of the invention mainly include the following:

(1) The attention mechanism module SGA is introduced to effectively extract and enhance the sun glint features of interest.

The invention adopts the classic encoder-decoder structure of UNet to simultaneously capture high-level global context information and low-level image details through skip connections. Due to the outstanding brightness and contrast of the sun glint, the sun glint attention mechanism module SGA is introduced to extract and enhance the sun glint features. The features of the last layer of the first three decoders of UNet are up-sampled to the size of 224×224×2 and supervised by the ground truth through the SGA module of the invention. The SGA module of the invention extracts the feature F1 from input feature through the 3×3 convolution layer. The F2 feature is extracted from the F1 feature through the first 1×1 convolution layer. The F3 feature is extracted from the feature F2 through the SE attention module. The sun glint feature F4 is enhanced by the multiplication and fusion of F2 feature and F3 feature. The further enhanced sun glint feature F is obtained by adding the features extracted from F4 through the second 1×1 convolution layer to feature F1.

(2) Using Focal and Dice hybrid loss functions to guide semantic segmentation network training to solve the problem of interclass imbalance between sun glint and background.

Because the sun glint is usually concentrated in a certain corner of the high-resolution UAV optical RGB ocean image and occupies a small proportion, it leads to serious interclass data imbalance. To solve this problem, the present invention uses Focal and Dice hybrid loss functions to guide the training of SGNet semantic segmentation network. Focal loss function focuses on difficult samples from the perspective of sample classification difficulty, so as to solve the problem of model training caused by sample imbalance. The Dice loss function is based on the Dice coefficient and is used to evaluate the similarity between the predicted segmentation image and the real segmentation image. The characteristics of the first three SGNet decoders output by SGA are supervised by Dice loss function, and the final output of the network is supervised jointly by Focal and Dice loss function.

(3) The sun glint in high-resolution UAV optical RGB ocean images can be effectively repaired using the sun glint repair method based on optical flow, and the true benthic image features can be restored.

The optical flow method describes the instantaneous motion state of pixels of moving objects (such as cameras or observed objects) to represent the correspondence between adjacent frames, and then calculates the motion information of objects between adjacent frames. The high-resolution UAV optical RGB ocean image has the characteristics of high overlap, continuous shooting and consistent brightness, which creates a good prerequisite for the sun glint restoration based on optical flow. Based on this, the invention proposes a sun glint repair method based on optical flow to effectively repair the sun glint in high-resolution UAV optical RGB ocean images and restore the real benthic image features.

The invention utilizes RAFT optical flow estimation network to extract optical flow field of adjacent high-resolution UAV optical RGB ocean image, and utilizes optical flow propagation and cycle iteration of CSA single image repair to obtain the final sun glint repair result.

Specifically, the pixels blocked by the sun glint are propagated forward and backward optical flow respectively until two known pixels are obtained. Forward optical flow propagation and backward optical flow propagation are carried out on the sun glint blocking pixel until two known pixels are obtained. Perform pre- and post-consistency checks on known pixels to ensure the effectiveness of pixel propagation. The consistency check ensures that the optical flow values of the forward optical flow and the backward optical flow of the two frames are equal and opposite. The front and back consistency is measured by the consistency error, which is defined as the two norm of the sum of the forward optical flow and the backward optical flow. The formula is as follows:

$$err_{mn}(i) = \sqrt{(f_{mn}(i))^2 + (f_{nm}(j))^2} \ ;$$

Wherein, i and j represent the corresponding pixels on image frame m and image frame n, $err_{mn}$ represents the consistency error, and $f_{mn}$ represents the optical flow value from image frame m to image frame n.

Weight assignment is performed on the two known pixels obtained based on the consistency error, and finally the final repaired pixel is obtained by weighted fusion of the two known pixels. The weight formula is as follows:

$$w = \frac{err_{mean}}{err}$$

Wherein, w represents the weight, err represents the consistency error, and $err_{mean}$ represents the mean value of the consistency error.

For pixels that cannot be repaired by optical flow propagation, the CSA image generation network is used to repair a single image, and the repair result is added to the optical flow propagation of the next cycle iteration as a known value to obtain the final sun glint repair result.

Figure 7:
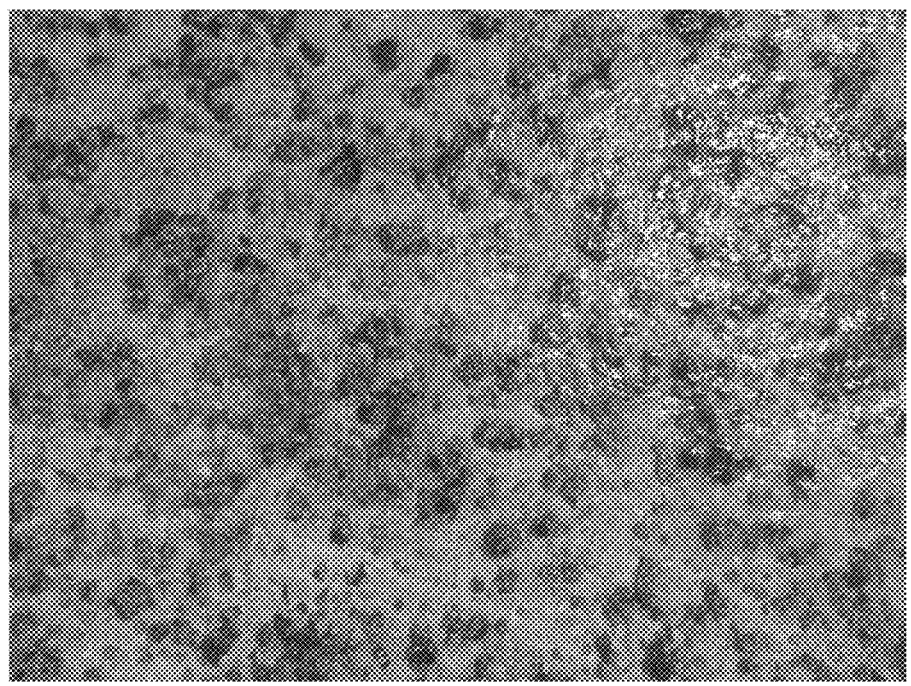
FIG. 7 is schematic diagram 1 of the original high-resolution UAV optical RGB ocean image provided by the embodiment of the invention.
Figure 8:
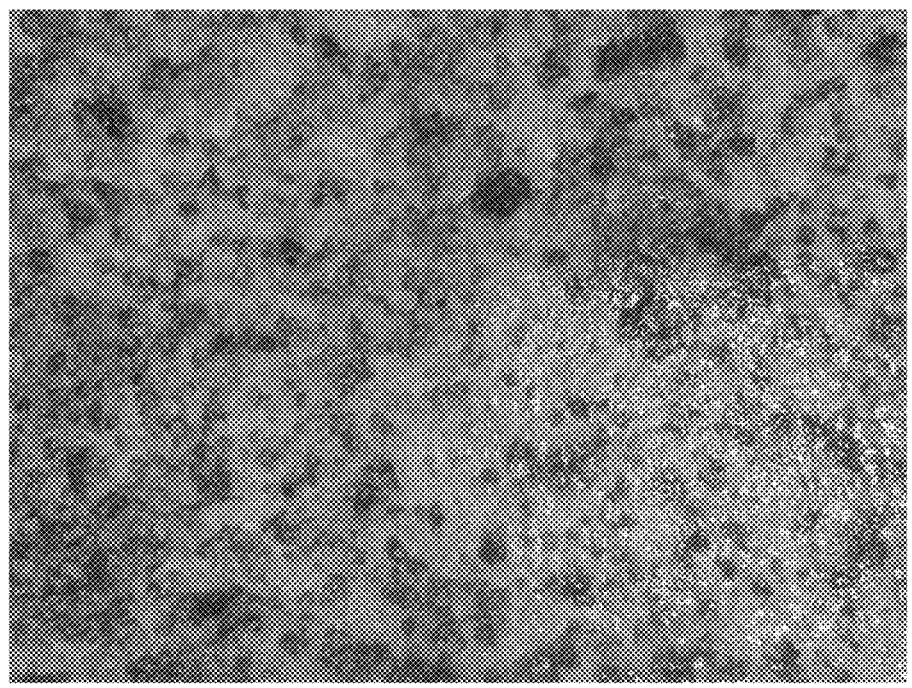
FIG. 8 is schematic diagram 2 of the original high-resolution UAV optical RGB ocean image provided by the embodiment of the invention.

In order to verify the effectiveness and superiority of the detection and repair method of sun glint in high-resolution unmanned aerial vehicle (UAV) optical RGB ocean image based on attention mechanism and optical flow provided by the embodiment of the invention, the high-resolution unmanned aerial vehicle optical RGB ocean image data set is used and experimentally compared with the UNet method under the same operating environment of hardware and software. The schematic diagram of high-resolution UAV optical RGB ocean image dataset is shown in FIG. 7 and FIG. 8. There are a large number of sun glint instances in UAV optical RGB ocean images, which have a great impact on image quality and image details.

Figure 9:
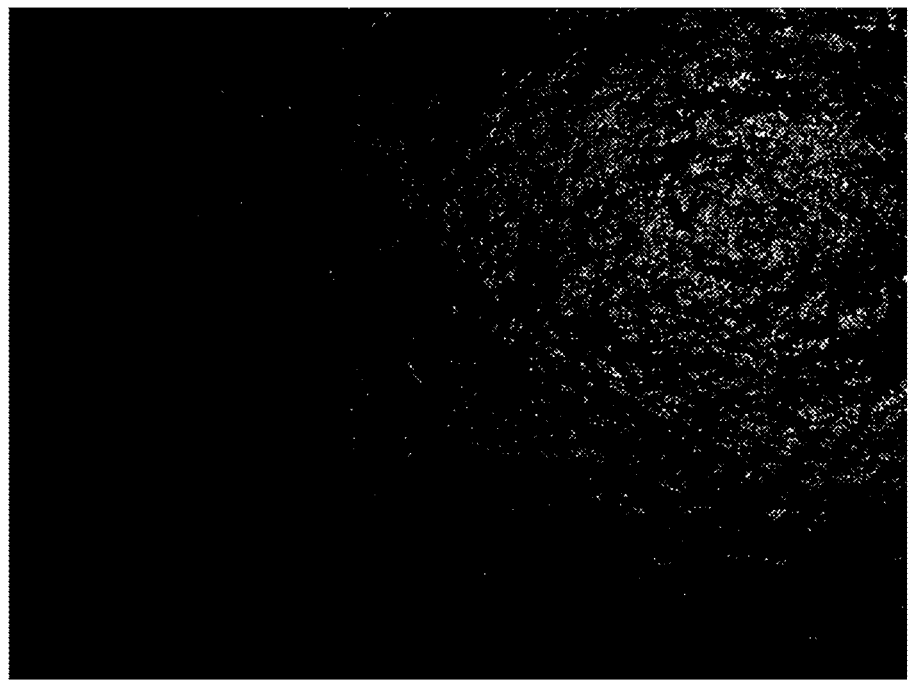
FIG. 9 is the schematic diagram 1 of the sun glint detected by SGNet provided by the embodiment of the invention.
Figure 10:
FIG. 10 is the schematic diagram 2 of sun glint detected by SGNet provided by the embodiment of the invention.

The image patches of 224×224 pixels were randomly clipped on the high-resolution UAV optical RGB ocean image dataset, and the image patches with no sun glint or less sun glint coverage were discarded. In order to fairly compare the two methods, the present invention provides the results of Mean Intersection over Union (mIoU), Intersection over Union of background class ($IoU_{background}$), Intersection over Union of sun glint class ($IoU_{sun\ glint}$) for high-resolution UAV optical RGB ocean image data set using UNet and SGNet, as shown in Table 1. The intersection ratio of background and sun glint in UNet method is 99.37% and 74.43% respectively. The detection accuracy of the sun glint method of the invention is significantly improved compared with UNet, in particular, the Intersection over Union of the sun glint category is increased by 6.49% compared with UNet, and the detection accuracy is greatly improved. FIG. 9 and FIG. 10 are the results of using SGNet to detect sun glint in high-resolution UAV optical RGB ocean images. It can be seen that SGNet accurately detected the sun glint region.

TABLE 1

Comparison of sun glint detection results

|  | UNet method (%) | Method of the invention (%) |
|---|---|---|
| mIoU | 86.90 | 90.27 |
| $IoU_{background}$ | 99.37 | 99.61 |
| $IoU_{sun\ glint}$ | 74.43 | 80.92 |

Figure 11:
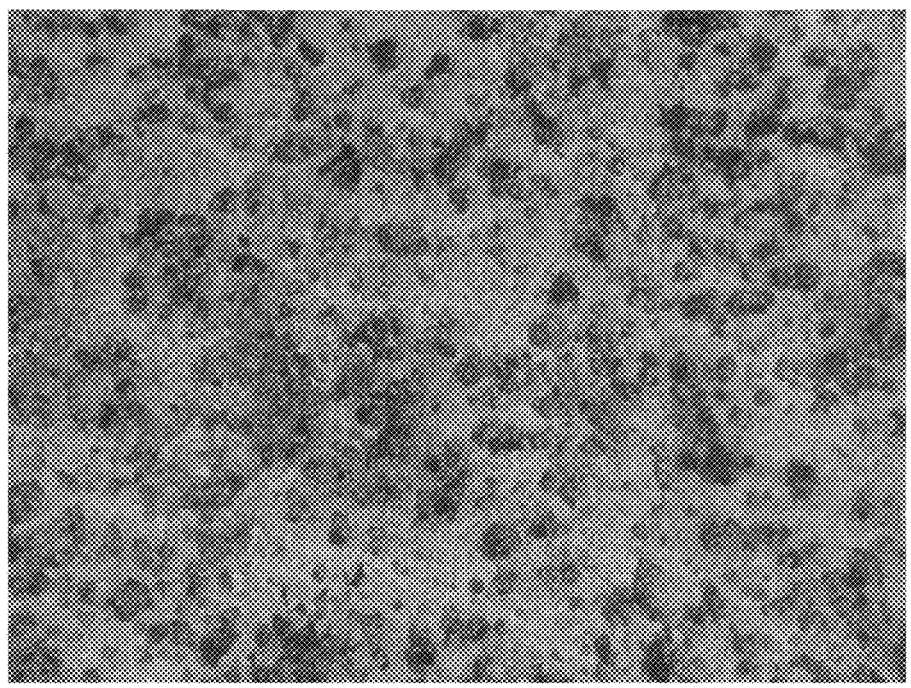
FIG. 11 is a schematic diagram 1 of the sun glint repair result provided by the embodiment of the invention.
Figure 12:
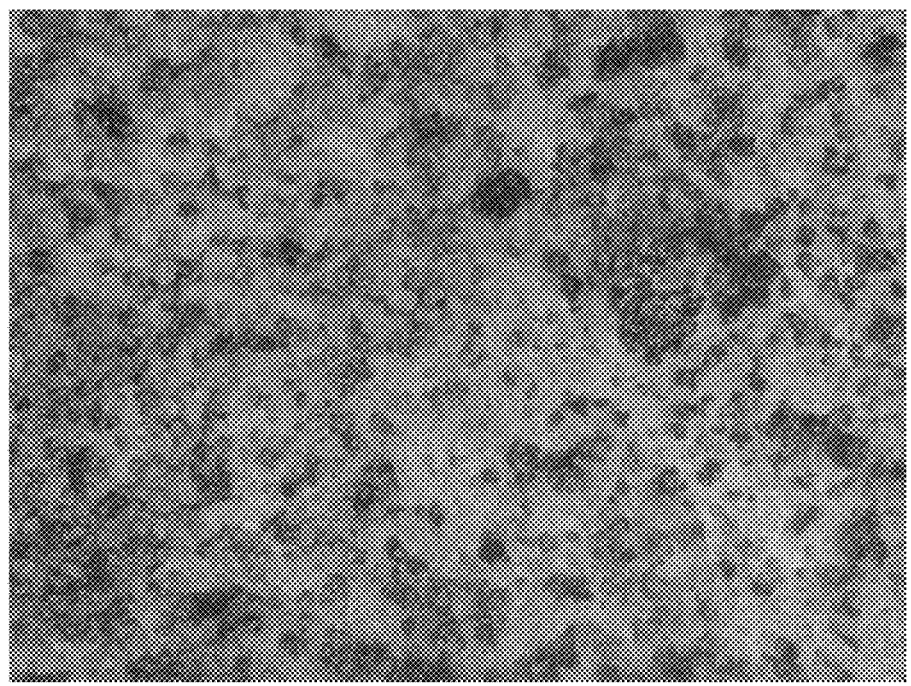
FIG. 12 is a schematic diagram 2 of the sun glint repair result provided by the embodiment of the invention.

FIG. 11 and FIG. 12 are the results of sun glint repair of high-resolution UAV optical RGB ocean image after processing by the sun glint repair method based on optical flow provided by the embodiment of the invention. It can be seen that the sun glint repair method proposed by the invention can effectively repair the sun glint on high-resolution UAV optical RGB ocean image. The image features of marine benthos are restored as true as possible, which provides a high-quality image basis for benthos monitoring and seabed topography mapping based on high-resolution UAV optical RGB marine images.

It should be noted that embodiments of the invention can be realized by hardware, software, or a combination of software and hardware. The hardware part can be realized by using special logic. The software portion can be stored in memory and executed by an appropriate instruction execution system, such as a microprocessor or specially designed hardware. A person of ordinary skill in the art may understand that the above devices and methods may be implemented using computer-executable instructions and/or contained in processor control code, Such code is provided, for example, on a carrier medium such as a disk, CD or DVD-ROM, on a programmable memory such as read-only memory (firmware), or on a data carrier such as an optical or electronic signal carrier. The device and its module of the invention can be realized by hardware circuits of programmable hardware devices such as VLics or gate arrays, semiconductors such as logic chips, transistors, etc., or by software executed by various types of processors. It can also be achieved by a combination of the above hardware circuits and software, such as firmware.

The above is only the specific embodiment of the invention, but the scope of protection of the invention is not limited to this, and any modification, equivalent replacement and improvement made by any technical person familiar with the technical field within the technical scope disclosed by the invention and within the spirit and principles of the invention shall be covered by the scope of protection of the invention.

What is claimed is:

1. A method for detecting and repairing sun glint in Unmanned Aerial Vehicle (UAV) optical RGB ocean images, which comprises: constructing a semantic segmentation network model based on the attention mechanism by using the sun glint attention module; guiding the semantic segmentation network training by a hybrid loss function of Focal and Dice, detecting the sun glint region by the trained semantic segmentation network structure (SGNet); extracting an optical flow field of high-resolution UAV optical RGB ocean images by RAFT optical flow estimation network, and transmitting the sun glint region by optical flow propagation to repair the sun glint in UAV optical RGB ocean images and recover the real benthic image features;

The method for detecting and repairing sun glint in UAV optical RGB ocean images comprises the following steps:

Step 1, introducing the sun glint attention (SGA) module into a Convolutional Networks for Biomedical Image Segmentation (UNet network structure) to extract and enhance the interesting sun glint features and construct the semantic segmentation network;

Step 2, guiding the semantic segmentation network training by the Focal and Dice hybrid loss function, and detecting the sun glint region by the trained semantic segmentation network SGNet;

Step 3, extracting the optical flow fields of adjacent high-resolution UAV optical RGB ocean images by Recurrent All-Pairs Field Transforms (RAFT) optical flow estimation network;

Step 4, propagating optical flow between image frames by the sun glint region detected by SGNet and the optical flow field extracted by RAFT to repair the pixels blocked by sun glint;

Step 5, repairing a single image by a coherent semantic attention (CSA) image generation network for pixels that cannot be repaired by optical flow propagation, and adding a repair result to the optical flow propagation of the next iteration as a known value to obtain the final sun glint repair result;

Optical flow propagation between image frames in Step 4: obtaining forward and backward optical flow propagation of pixels blocked by sun glint respectively until two known pixels; calculating consistency errors of two known pixels respectively, and assigning the weights according to the errors; Finally, obtaining the final repaired pixels by weighted fusion of two known pixels; Among them, the formula for calculating the consistency error is as follows:

$$err_{mn}(i) = \sqrt{(f_{mn}(i))^2 + (f_{nm}(j))^2};$$

Wherein, i and j represent the corresponding pixels on image frame m and image frame n, $err_{mn}$ represents consistency errors, and $f_{mn}$ represents the optical flow value from image frame m to image frame n;

The weighted fusion weight formula is as follows:

$$w = \frac{err_{mean}}{err};$$

Wherein, w represents the weight, err represents consistency error, and $err_{mean}$ represents the mean value of the consistency error.

2. The method for detecting and repairing sun glint in UAV optical RGB ocean images according to claim 1, wherein, in step 1, introducing the sun glint attention module SGA into the UNet network structure, which comprises: up-sampling and supervising the features of the last layer of the first three decoders of UNet to the size of 224×224×2 respectively by SGA module and by ground truth; Among them, the sun glint attention module SGA comprises:

extracting a feature F1 from the input feature using 3×3 convolution layer; extracting a F2 feature from the F1 feature through the first 1×1 convolution layer; extracting a feature F3 of interest from the feature F2 through the SE attention module; enhancing a sun glint feature F4 by the multiplication and fusion of F2 features and F3 features; obtaining a feature F of sun glint by adding the feature extracted by F4 through the second 1×1 convolution layer to feature F1.

3. The method for detecting and repairing sun glint in UAV optical RGB ocean images according to claim 1, wherein, in step 2, guiding semantic segmentation network training by a Focal and Dice hybrid loss functions, which comprises: supervising the output features of first three SGNet decoders via SGA by Dice loss function, and supervising a final output of the network by Focal and Dice loss function.

4. A system for detecting and repairing sun glint in UAV optical RGB ocean images, which applies the method for detecting and repairing sun glint in UAV optical RGB ocean images according to claim 1, wherein, the system for detecting and repairing sun glint in UAV optical RGB ocean images comprises:

Semantic segmentation network builder, which is used to introduce the sun glint attention (SGA) module into the UNet network structure to extract and enhance the interesting sun glint features and construct the semantic segmentation network;

Sun glint region acquirer, which is used to guide semantic segmentation network training by using Focal and Dice hybrid loss function, and detect the sun glint region by using the trained semantic segmentation network;

Optical flow field extractor, which is used to extract optical flow fields of adjacent high-resolution UAV optical RGB ocean images using RAFT optical flow estimation network;

Sun glint repairer, which is used to use the sun glint region and optical flow field to carry out optical flow propagation between image frames to repair pixels blocked by sun glint; For pixels that cannot be repaired by optical flow propagation, the CSA image generation network is used to repair a single image, and the repair result is added to the optical flow propagation of the next cycle iteration as a known value to obtain the final sun glint repair result.

5. A computer device is characterized in that the computer device comprises a memory and a processor, the memory stores a computer program, and when the computer program is executed by the processor, the processor performs steps of the method for detecting and repairing sun glint in UAV optical RGB ocean images according to claim 1.

* * * * *